United States Patent [19]

Fujimoto

[11] 4,445,156

[45] Apr. 24, 1984

[54] FLOPPY DISC DRIVE UNIT

[75] Inventor: Sakae Fujimoto, Chofu, Japan

[73] Assignee: Ricoh Company, Ltd., Japan

[21] Appl. No.: 291,993

[22] Filed: Aug. 11, 1981

[30] Foreign Application Priority Data

Aug. 14, 1980 [JP] Japan .............................. 55-112181[U]
Aug. 14, 1980 [JP] Japan .................................. 55-112182
Aug. 14, 1980 [JP] Japan .............................. 55-115548[U]

[51] Int. Cl.³ ...................... G11B 17/04; G11B 5/016; G11B 23/04
[52] U.S. Cl. ........................................ 360/99; 360/97; 369/75.1; 369/270
[58] Field of Search ..................... 360/99, 97, 133, 86, 360/137; 369/77, 261, 270, 271

[56] References Cited

U.S. PATENT DOCUMENTS

| | | | |
|---|---|---|---|
| 3,815,150 | 6/1974 | Stoddard | 360/99 |
| 3,940,793 | 2/1976 | Bleiman | 360/99 |
| 3,959,823 | 5/1976 | Heidecker et al. | 360/99 |
| 4,040,107 | 8/1977 | Bryer | 360/99 |
| 4,205,355 | 5/1980 | Hamanaka | 360/99 |
| 4,216,510 | 8/1980 | Manzke et al. | 360/99 |
| 4,339,778 | 7/1982 | Wise | 360/99 |
| 4,352,132 | 9/1982 | Gyi | 360/133 |

Primary Examiner—Stuart N. Hecker
Attorney, Agent, or Firm—Guy W. Shoup

[57] ABSTRACT

An operating lever is pivotally mounted on a floppy disc drive intermediate its ends, and has its one end exposed externally of the unit to serve as an operating handle while its other end is connected to a link. The link is connected to a motion mechanism which translates an oscillating motion into a rectilinear reciprocating motion. The reciprocating motion mechanism includes a movable element which is integral with a member that carries a floppy disc. In response to an oscillation of the operating lever, the movable element reciprocates together with the handle member of the floppy disc, whereby the floppy disc can be inserted into or removed from a given clamped position. Another link is connected to the other end of the operating lever and is connected to motion translating means which causes a clamp member to reciprocate in a direction perpendicular to the plane in which the operating lever oscillates, thus clamping or unclamping the floppy disc as the operating lever oscillates. The operating lever is associated with a detent or lock/unlock mechanism which locks the floppy disc at angular positions corresponding to insert limit and/or clamp limit assumed in the drive unit or releases or unlocks the disc.

79 Claims, 24 Drawing Figures

F I G. 5
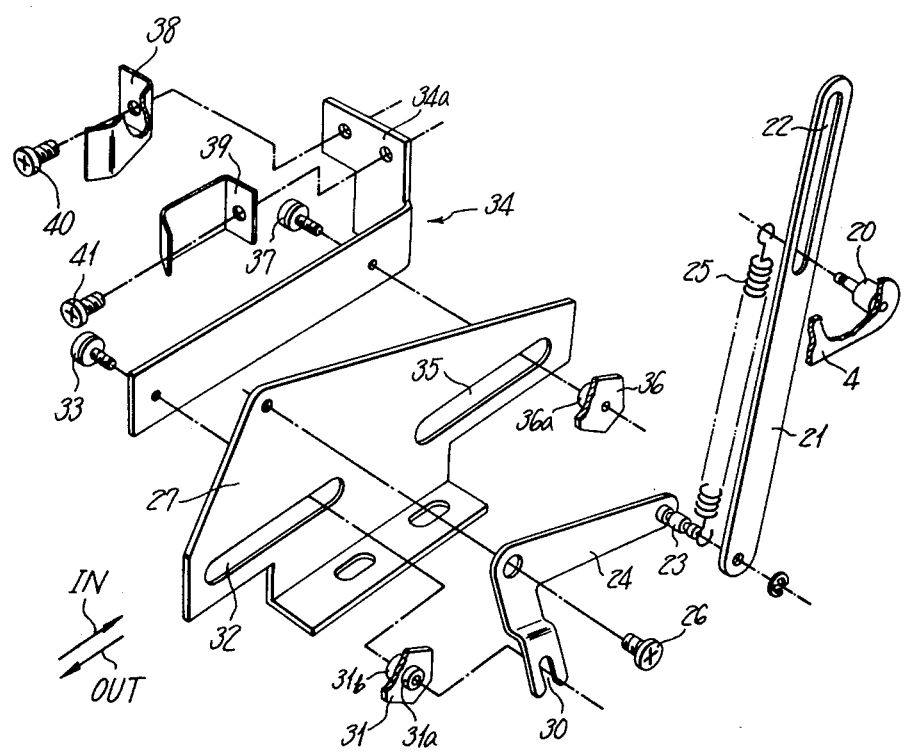

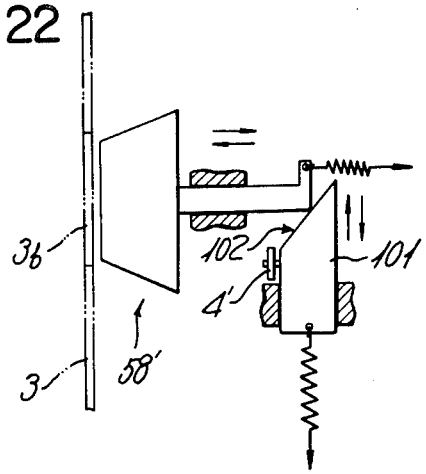
FIG. 22
FIG. 23
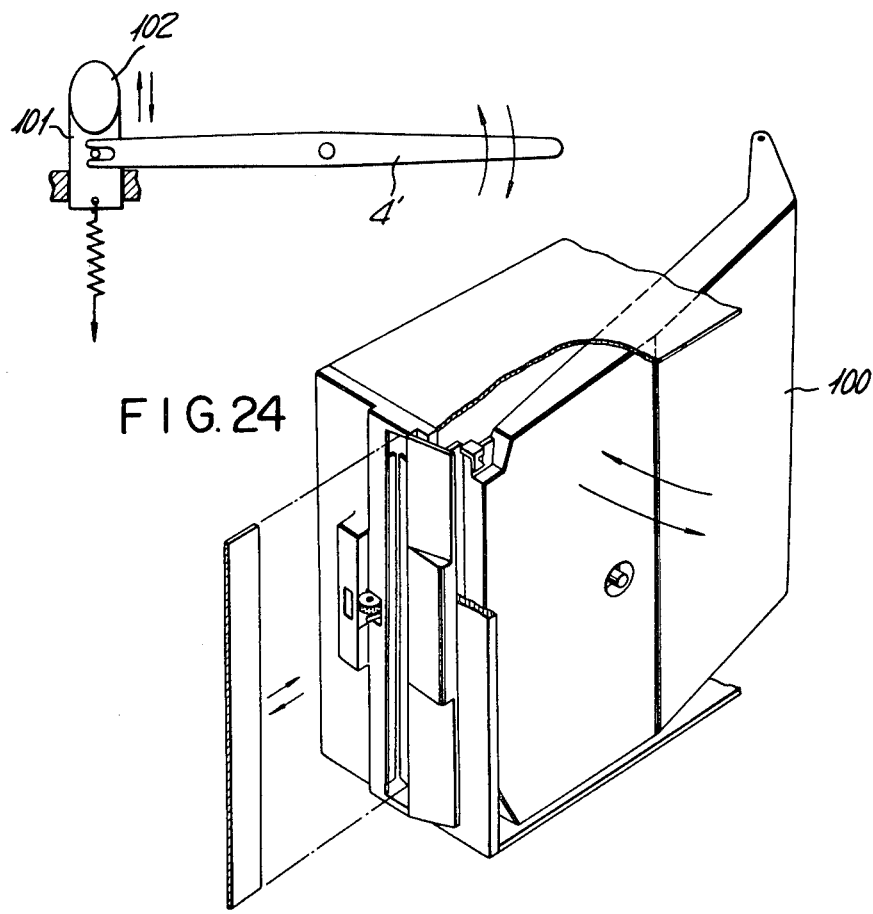
FIG. 24

FLOPPY DISC DRIVE UNIT

BACKGROUND OF THE INVENTION

The invention relates to a floppy disc drive unit.

A floppy disc drive unit is known which holds a floppy disc between an abutment surface of a rotatable member and a clamp member which is movable toward or away from the abutment surface and in which the rotatable member causes the floppy disc to rotate, thus permitting an information entry and retrieval. In a conventional arrangement, a movement of the clamp member toward or away from the abutment surface of the rotatable member takes place by utilizing an oscillating motion which occurs as a cover, which has its one end pivotally mounted on a stationary part, is opened and closed. However, in the prior arrangement, an increased stroke is required through which the cover is to be opened or closed, resulting in an increased thickness of the floppy disc drive unit. In addition, the opening or closing of the cover is rather troublesome, and it is not straightforward to apply a force thereto, which is undesirable from the standpoint of the human engineering.

When loading a floppy disc into the floppy disc drive unit, it is loaded in place by pushing the floppy disc while holding it with a hand placed therealong. The floppy disc is removed under resilience of a spring or the like. However, such loading and removal greatly depends on the feeling sensed by an operator, so that there has been a likelihood that the clamp assembly is operated before the floppy disc is fully inserted, thus causing a damage thereto or causing a failure of the floppy disc drive unit to operate.

SUMMARY OF THE INVENTION

It is an object of the invention to provide a clamp assembly for a floppy disc which allows a great reduction in the thickness of a floppy disc drive unit and also facilitates its operation.

It is another object of the invention to provide an apparatus for inserting a floppy disc into a given drive position properly and for allowing it to be moved therefrom to a location where the removal is facilitated, both through a simple lever operation.

It is a further object of the invention to provide a floppy disc drive unit capable of allowing an insertion or removal as well as a clamp/unclamp operation of a floppy disc through a simple lever operation.

The above and other objects of the invention are achieved in accordance with the invention by a selective or general combination of a detent assembly capable of locking an angular movement at any intermediate position thereof during its stroke, first mechanical means for translating an oscillating motion of an operating lever into a reciprocating motion in a direction which coincides with the direction of insertion or removal of a floppy disc, and second mechanical means for translating an oscillating motion of the operating lever into a motion in a direction perpendicular to the plane of the floppy disc mounted in place. The first mechanical means includes a movable element on which a holder for a floppy disc is mounted. The second mechanical means also includes a movable element on which a clamp member is mounted.

BRIEF DESCRIPTION OF THE DRAWINGS

FIG. 5 is an exploded perspective view of an apparatus for inserting or removing a floppy disc.

FIG. 22 is a front view of another form of motion transmitting means.

FIG. 23 is a left-hand side elevation of the transmitting means shown in FIG. 22.

FIG. 24 is a view showing an oscillation of a cover.

DESCRIPTION OF EMBODIMENTS

Figure 1:
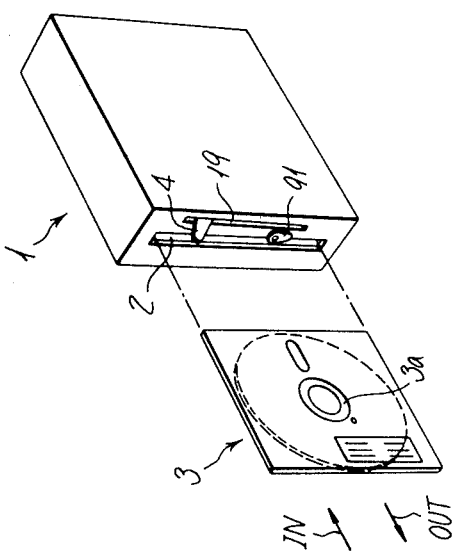
FIG. 1 is a perspective view of a floppy disc drive unit and a floppy disc.

Referring to FIG. 1, a floppy disc drive unit is generally shown by numeral 1 in the form of a box having a rectangular inlet 2 formed in its front surface. A floppy disc 3 may be inserted into the drive unit 1 through the inlet 2 to be loaded therein. The loading takes place in conjunction with a closing operation of an operating lever 4. It is to be noted that the operating lever 4 has a margin of angular movement such that it can be further moved angularly after the floppy disc 3 is loaded in a given drive position within the drive unit 1. An angular movement of the operating lever 4 through such margin permits a clamp member to clamp a rotatable medium within the disc 3 to a rotary member which drives it for information entry and retrieval. The operating lever 4 is locked at an angular position which it assumes when the record medium 3a is clamped to the rotary member integrally.

After the information entry or retrieval, the floppy disc 3 may be interchanged with another by unlocking the operating lever 4 and turning it in its opening direction. The disc is unclamped in connection with such movement, whereby the disc 3 is displaced out of the drive unit 1.

The above description covers the general operation involved with the loading and removal of the floppy disc.

A floppy disc is inserted to a given drive position within the drive unit or externally removed therefrom by an apparatus for inserting and removing a floppy disc. The floppy disc is clamped at the drive position or unclamped by a clamp assembly associated with the floppy disc. An apparatus for locking and unlocking a rockable member or operating lever operates to lock or unlock the operating lever, representing the prime mover for the described operations, at various positions. These apparatus and assembly will be more specifically described below.

(1) Apparatus for inserting or removing floppy disc

Figure 4:
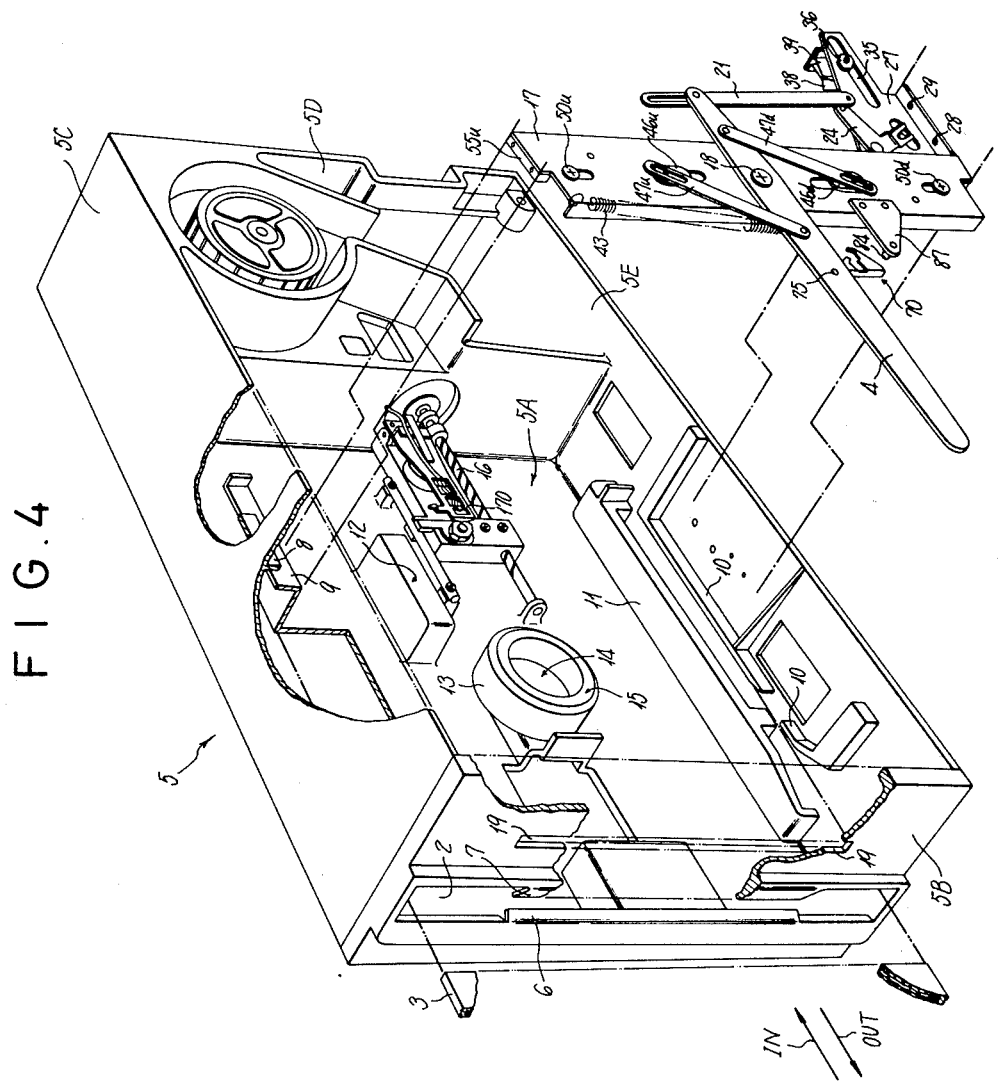
FIG. 4 is a perspective view of a frame of the floppy disc drive unit.

Referring to FIG. 4, various members and elements which constitute together the floppy disc drive unit are assembled into a frame 5. The frame 5 includes a bottom 5A, and four sidewalls 5B, 5C, 5D, 5E which are contiguous with the bottom 5A. The inlet 2 is formed in the front sidewall 5B. It will be noted that a pair of guide pieces 6, 7 are formed centrally alongside the inlet 2 for facilitating the insertion of a floppy disc thereinto, and are inwardly folded back.

A member 8 projects from the sidewall 5C and is spaced from an extension 9 of the bottom 5A by a distance which is slightly greater than the thickness of the floppy disc 3, thus defining a path therebetween. Similarly, a pair of members 10, 11 projecting from the sidewall 5E in opposing relationship with each other are spaced by the same distance to form a path therebetween also. These members also serve as guide members for inserting the floppy disc into the drive position through the inlet 2 as the floppy disc is changed. A plateau 12 formed on the bottom 5A has its free end located in the common plane as the inlet 2 so as to guide the floppy disc as the latter is changed.

A rotatable member 13 in the form of a mortar having its central region hollowed out as shown at 14 is mounted on the bottom 5A substantially at the center thereof. The rotatable member 13 has an annular end face which is referred to herein as an abutment surface 15. A shaft which causes the rotatable member 13 to rotate is not shown, but is rotatably carried by a bearing disposed in the bottom 5A to extend to the opposite side or the outside thereof so as to be integrally connected with a flywheel. When a floppy disc is to be driven, a power unit, not shown, causes the disc to be rotated at a given speed.

A magnetic head assembly 170 which is used for read-write operation is located to the right of the rotatable member 13 and is adapted to translate linearly in accordance with the rotation of a lead screw 16.

A channel-shaped substrate 17 extends across the sidewalls 5C, 5E and has its opposite ends secured to these sidewalls so as to be located opposite to the rotatable member 13.

A screw 18 is threadably engaged with the substrate 17 at a location in alignment with the central axis of the rotatable member 13 for pivotally mounting the operating lever 4 so as to be rockable in a plane parallel to the plane of the floppy disc.

One end of the operating lever 4 projects externally through a slit 19 formed in parallel relationship with the inlet 2 at a location adjacent thereto to serve as a handle to be operated by an operator.

Figure 6:
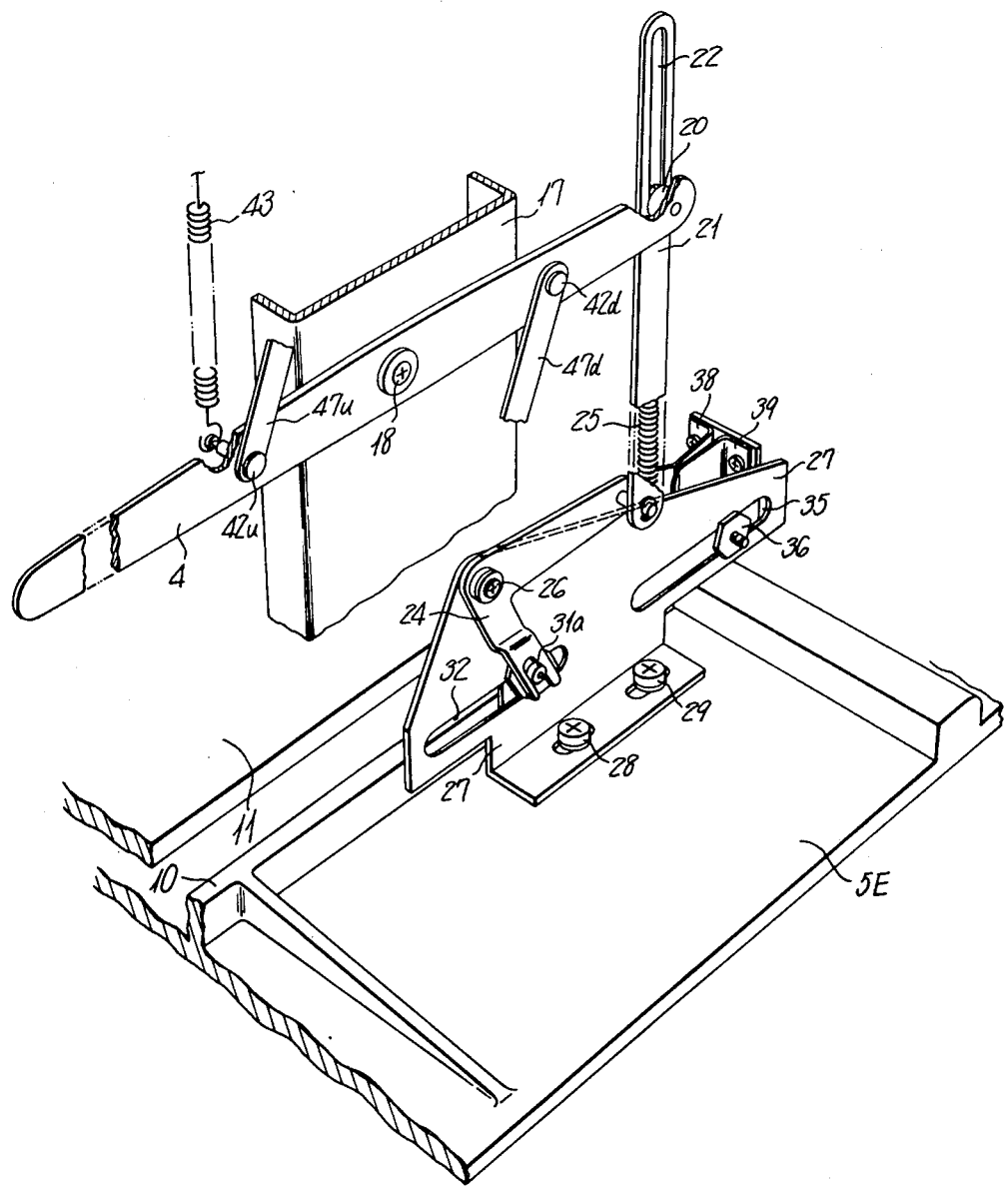
FIG. 6 is an overall perspective view of the apparatus shown in FIG. 5.

As shown in FIGS. 5 and 6, a stepped shaft 20 is mounted on the other end of the operating lever 4, and includes a portion of a reduced diameter which is slidably engaged in an elongate slot 22 formed in a link 21 which has its other end pivotally mounted on a pin 23, which is in turn fixedly mounted on one end of an L-shaped lever 24. A tension spring 25 extends between the shaft 20 and the pin 23, thus normally maintaining the shaft 20 in abutment against the lower end of the slot 22. The lever 24 essentially defines a bell crank which is pivotally mounted on an L-shaped member 27 by means of a screw 26. Referring to FIG. 6, it will be seen that the L-shaped member 27 is secured to the sidewall 5E by means of set screws 28, 29. Returning to FIG. 5, the other end of the lever 24 is formed into a fork 30, which is slidably engaged by a shank 31a formed on the front side of a nut 31. On its opposite side, the nut 31 is also formed with another shank 31b which extends through an elongate slot 32 formed in the L-member 27 to have a movable member 34 mounted on its free end by means of a screw 33. The slot 32 formed in the L-member 27 is elongate in a direction corresponding to IN and OUT directions of the floppy disc. The L-member 27 is also formed with a similar slot 35 located adjacent to the slot 32 and which is elongate in the same direction.

A nut 36 has a shank 36a which extends through the slot 35 and which is integrally secured to the movable member 34 by means of a screw 37. It is to be understood that the movable member 34 is slidable in the IN and OUT directions within an extent allowed by the length of the respective slots 32, 35. At its one end, the movable member 34 is folded in a direction transverse to the IN direction to form an extention 34a, to which a pair of holder pieces 38, 39, both formed of a resilient material, are secured by set screws 40, 41.

Figure 7:
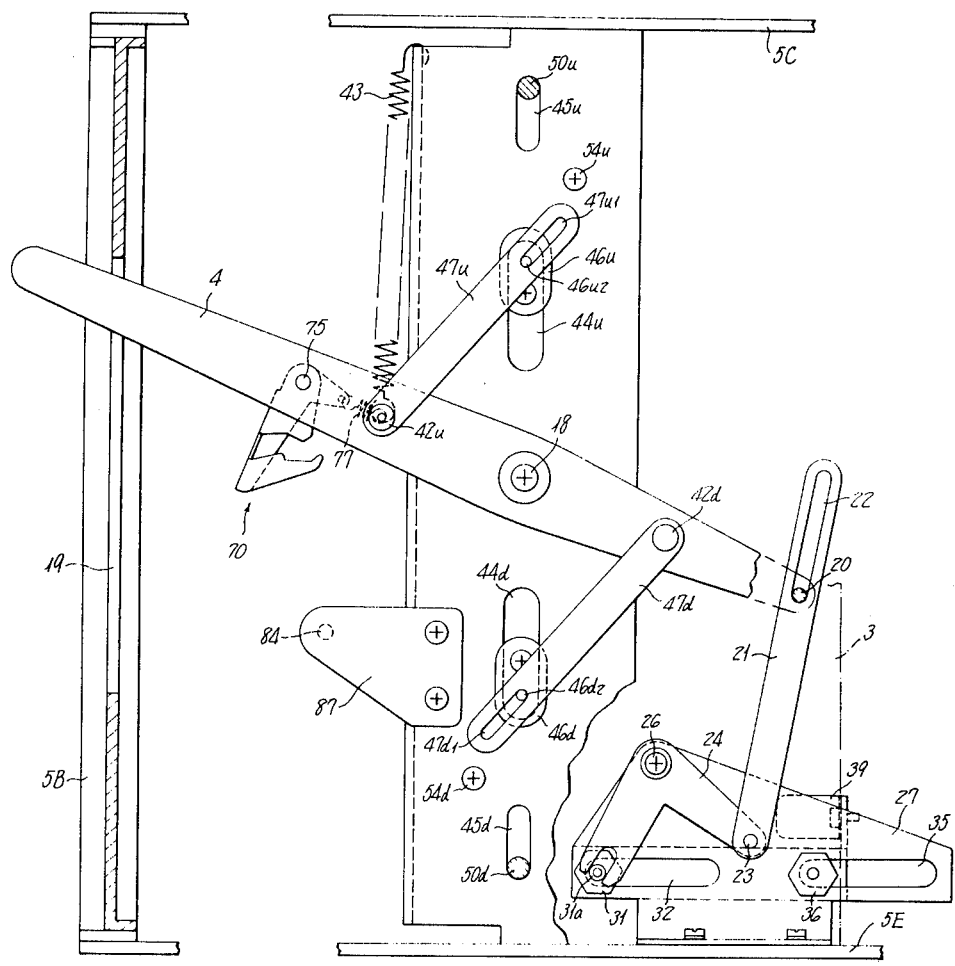
FIGS. 7, 8, 9 and 12 are front views of an apparatus for inserting or removing a floppy disc, a clamp assembly associated with a floppy disc and an apparatus for locking or unlocking a rockable member or operating lever, illustrating sequential steps of operation thereof.

Referring to FIGS. 6 and 7, a pin 42u is fixedly mounted on the operating lever 44 to the left of the screw 18, and a tension spring 43 extends between the pin 42u and the top shoulder of the substrate 17, thus urging the operating lever 4 to rotate clockwise about the pivot which is defined by the screw 18. The resulting angular movement of the operating lever is limited by the abutment of the shanks 31b, 36a against the left-hand end of the slots 32, 35. At this time, the movable member 34 is at the end of its stroke in the OUT direction while the operating lever 4 is at the upper limit of its stroke. Such position may be considered as an original position for operation. The floppy disc 3 is directly inserted through the inlet 2 by an operator under this condition. The disc 3 is guided by members 8, 9, 10 and 11 to move in the IN direction until its leading end is held between the holder pieces 38, 39. The floppy disc 3 is driven in the IN direction until its leading end bears against the folded extension 34a, whereupon the spring 43 becomes effective to apply a reaction to the hand of the operator where the loading of the floppy disc 3 is terminated (see FIG. 7).

Figure 2:
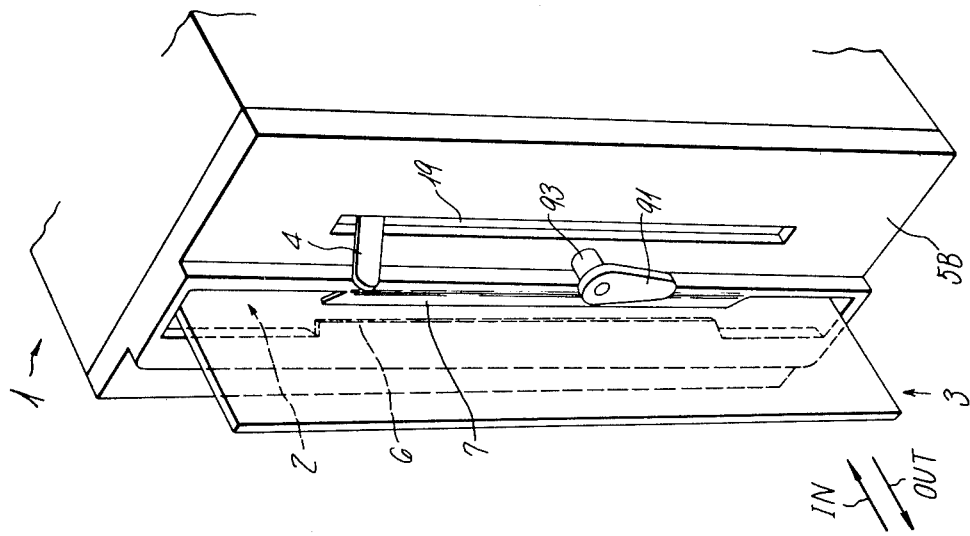
FIG. 2 is a fragmentary enlarged view of the disc.

The operator then moves the operating lever 4, which projects through the sidewall 5B as shown in FIG. 2, downward. The resilience of the spring 25 causes the shaft 20 to assume substantially the same condition as it were pivotally mounted at a point corresponding to the lower end of the slot 22, so that the link 21 is raised upward together with the shaft 20 as the operating lever 4 moves. The lever 24 is simultaneously driven to rotate counterclockwise about the pivot defined by the screw 26, whereby the fork 30 causes the shank 31a to move along the slot 32 to the right or in the IN direction. Since the shank 31a is substantially integral with the movable member 34, the latter also guides the floppy disc 3 in the IN direction, as guided by the slot 35. In this manner, the link 21, lever 24, nuts 31, 36 and slots 32, 35 form together with the movable member 34 motion translating means which translates an oscillating motion into a rectilinear reciprocating motion.

Figure 3:
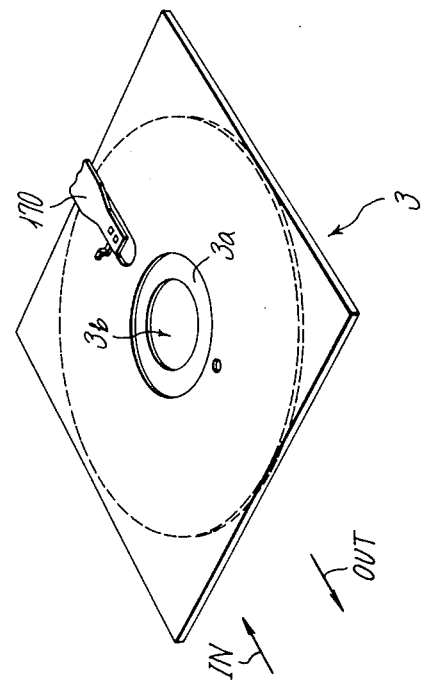
FIG. 3 is a perspective view illustrating the relationship between a head and the floppy disc under the drive condition.
Figure 8:
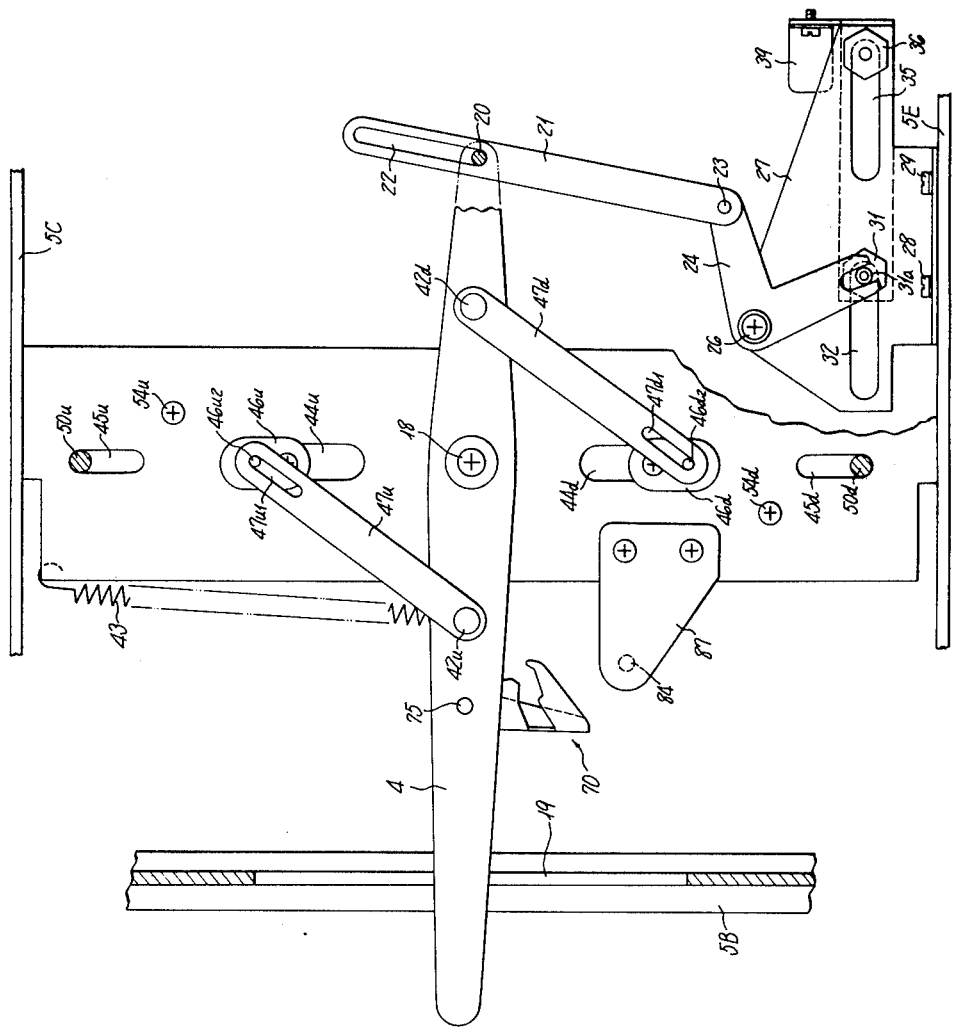

The movable member 34 ceases to move when either one of the shanks 31b, 36a or both bears against the right-hand end of the slots either separately or simultaneously (FIG. 8). At this time, a central opening 3b formed in the record medium 3a (FIG. 3) is substantially aligned with the center of the rotatable member 13. In other words, as a result of an operation of the operating lever 4, the floppy disc 3 is brought to or close to the drive position where the central opening 3b is substantially aligned with the rotatable member 13.

If the operating lever 4 is allowed to move down as by inertia, the mechanism of the invention is subject to no damage since the shaft 20 is allowed to slide within the slot 22e against the resilience of the spring 25, thus relieving any force.

It is to be understood that the arrangement including the slot 22, the shaft 20 and the spring 35, in addition to preventing any damage which may be caused to various members as the operating lever 4 is allowed to move by inertia, has the function of utilizing a continued angular movement of the operating lever 4 after the floppy disc 3 has been driven to its drive position in order to perform other work without imparting any influence upon the floppy disc insertion and removal apparatus by such angular movement.

In this manner, the floppy disc 3 is fed to a given drive position. Subsequently, the operating lever 4 may be turned or other means may be used to place the rotatable record medium, 3a in abutment against the rotating member 13 and to clamp it, thus enabling the recording or retrieval of information from the disc.

When the recording or retrieval of information to or from the floppy disc 3 is completed, the operating lever 4 may be unlocked, whereupon the resilience of the spring 43 causes the operating lever 4 to move clockwise about the pivot defined by the screw 18, whereby the movable member 34 is driven in the outward direction OUT until the rear end of the floppy disc 3 projects out of the inlet 2 (see FIG. 2). The movable member 34 comes to a stop when the operating lever 4 and the member 34 return to the original positions shown in FIG. 7.

It will be understood that when the floppy disc partly projects out of the inlet 2, it can be easily replaced or changed and that the the floppy disc can be properly positioned through an operation of the operating lever 4.

(2) Floppy disc clamp assembly

Figure 15:
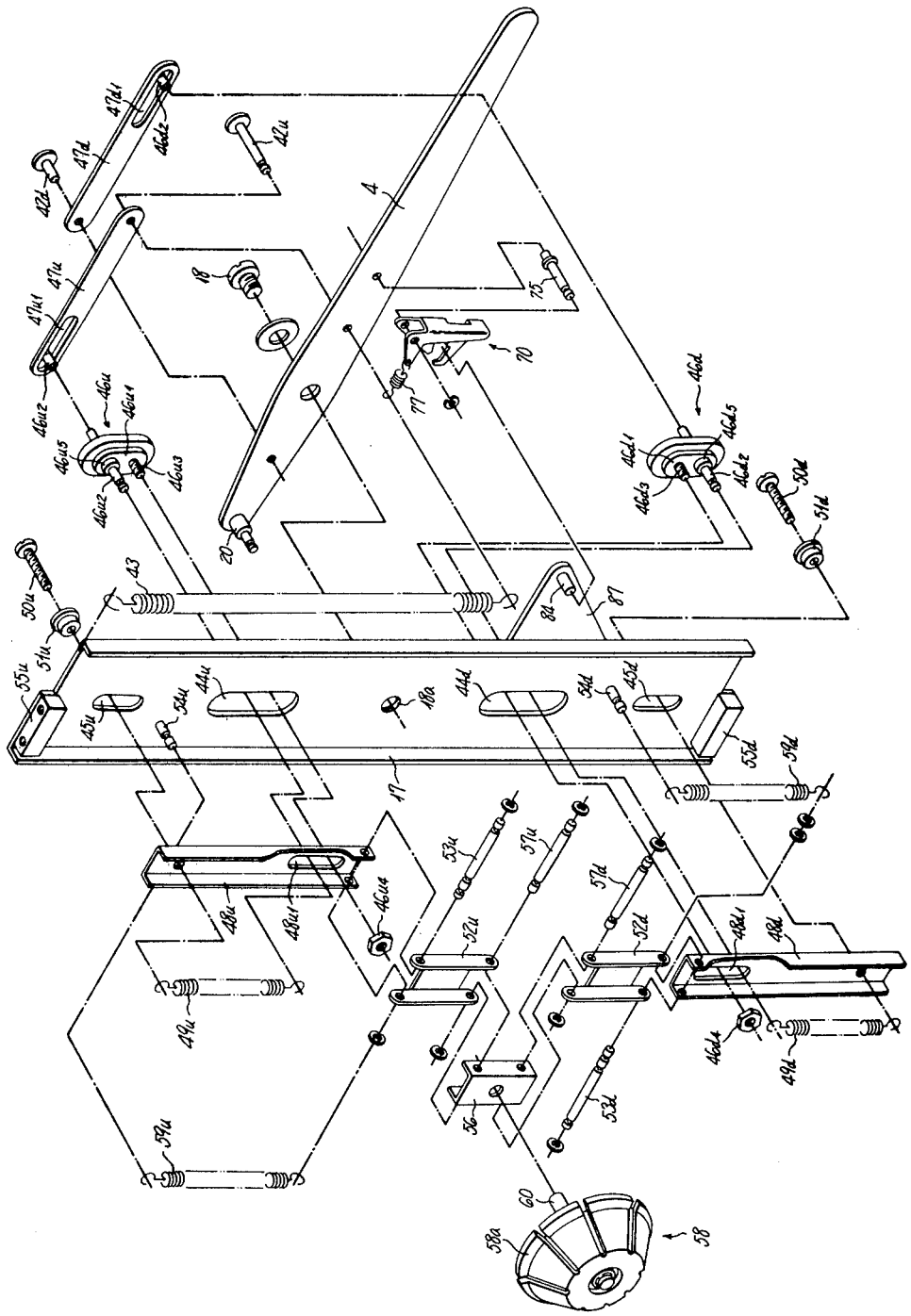
FIG. 15 is an exploded perspective view of the clamp assembly and the apparatus for locking or unlocking the rockable member.
Figure 16:
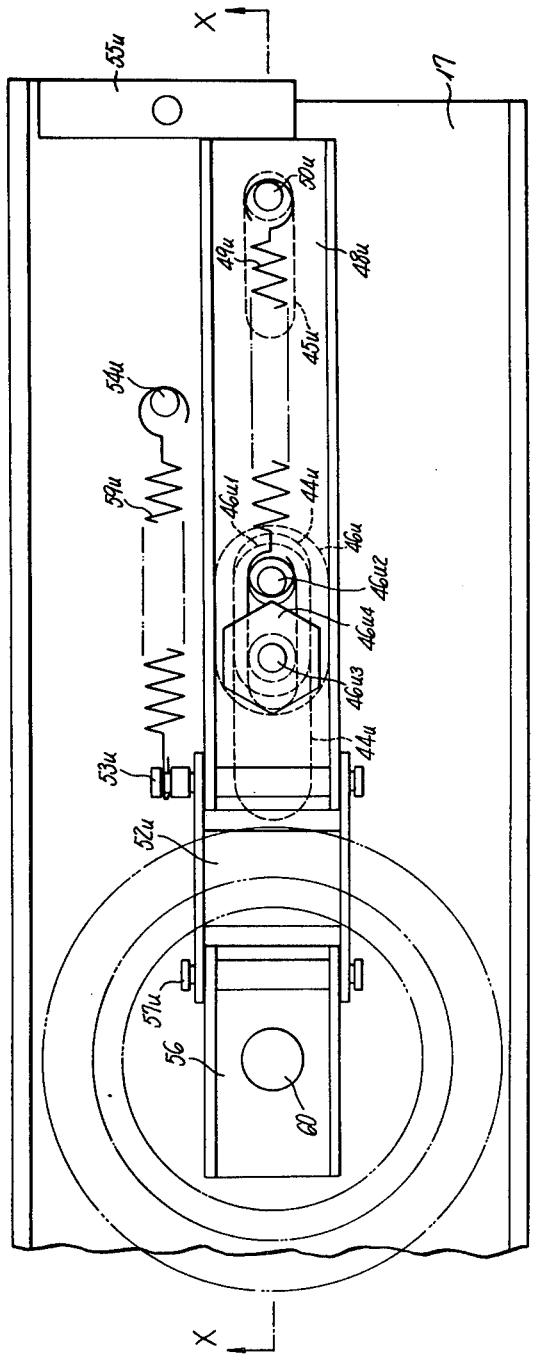
FIG. 16 is a rear view of the clamp assembly.

Referring to FIG. 15, the substrate 17 is formed with a pair of elongate slots 44u, 44d which are symmetrically located above and below the threaded bore 18a for the screw 18 on which the operating lever 4 is pivotally mounted. A pair of elongate slots 45u, 45d are further removed from the threaded bore 18a than the slots 44u, 44d, and are located at an equal distance from the bore.

A stepped movable element 46u has a small diameter portion 46u1 which is slidably fitted into the slot 44u from the front side of the substrate 17. A shaft 46u2 extends through the movable element 46u, and has its one end engaged with an elongate slot 47u1 formed in a link 47u. The other end of the shaft 46u2 extends through an elongate slot 48u1 formed in the lower portion of a slider 48u and is engaged by one end of a tension spring 49u. The movable element 46u also includes a larger diameter portion 46u5 which is slidably engaged with the slot 48u1.

The other end of the spring 49u is anchored to the end of a screw 50u which extends from the front side of the substrate 17 to extend through the slot 45u and is threadably engaged with the upper portion of the slider 48u. It is to be noted that a bushing 51u with a flange is fitted over the screw 50u as the latter extends through the slot 45u, whereby the substrate 17 is held between the slider 48u and the bushing 51u. It will be seen that the bushing 51u is slidable within the slot 45u in an integral manner with the slider 48u and the spring 49u.

A screw 46u3 is threadably engaged with the movable element 46u and extends therethrough to pass through the slots 44u and 48u1 to be finally engaged by a nut 46u4. While not clearly shown in FIG. 15, the nut 46u4 is formed with a boss which is slidably engaged with the slot 48u1 (see FIG. 17). The other end of the link 47u which is remote from the slot 47u1 is pivotally mounted on the pin 42u which is fixedly carried by the operating lever 4, with the free end of the pin 42u being engaged by one end of the spring 43.

The slider 48u has a pair of upright limbs along both of its lateral edges, across the lower ends of which extend a pin 53u on which the upper end of links 52u is pivotally mounted. A tension spring 59u engages one end of the pin 53u and has its other end anchored to a stud 54u which is fixedly mounted on the substrate 17, thus urging the slider 48u to move upward. However, the resulting movement of the slider in the upward direction is blocked by the abutment of the upper end thereof against a stop 55u. Alternatively, such movement may be blocked by causing the bushing 51u or the smaller diameter portion 46u1 to abut against the upper limit of the slot 45u or 44u. It is to be understood that the resilience of the spring 59u is less than the resilience of the spring 49u. The lower end of the links 52u is pivotally connected with the upper end of a pedestal 56 by means of a pin 57u. The pedestal 56 is centrally formed with an opening in which one end of a shaft 60 is secured, the shaft 60 rotatably carrying a clamp member 58 which is used to clamp a floppy disc It is to be noted that some parts to be described below, such as stepped movable element 46d, small diameter portion 46d1, shaft 46d2, screw 46d3, nut 46d4, larger diameter portion 46d5, link 47d, elongate slot 47d1, slider 48d, elongate slot 48d1, spring 49d, screw 50d, bushing 51d, link 52d, pins 53d, 54d, stop 55d, pin 57d and spring 59d are constructed in the same manner as those parts which are designated by corresponding numerals with a suffix u, and are shown in the drawings, but will not be described.

An end of a link 47d which is remote from a slot 47d1 formed therein carries a pin 42d which is pivotally received in the operating lever 4, it being understood that the pin 42d is located on the opposite side of the screw 48 from the area of the operating lever through which the pin 42u extends.

Figure 17:
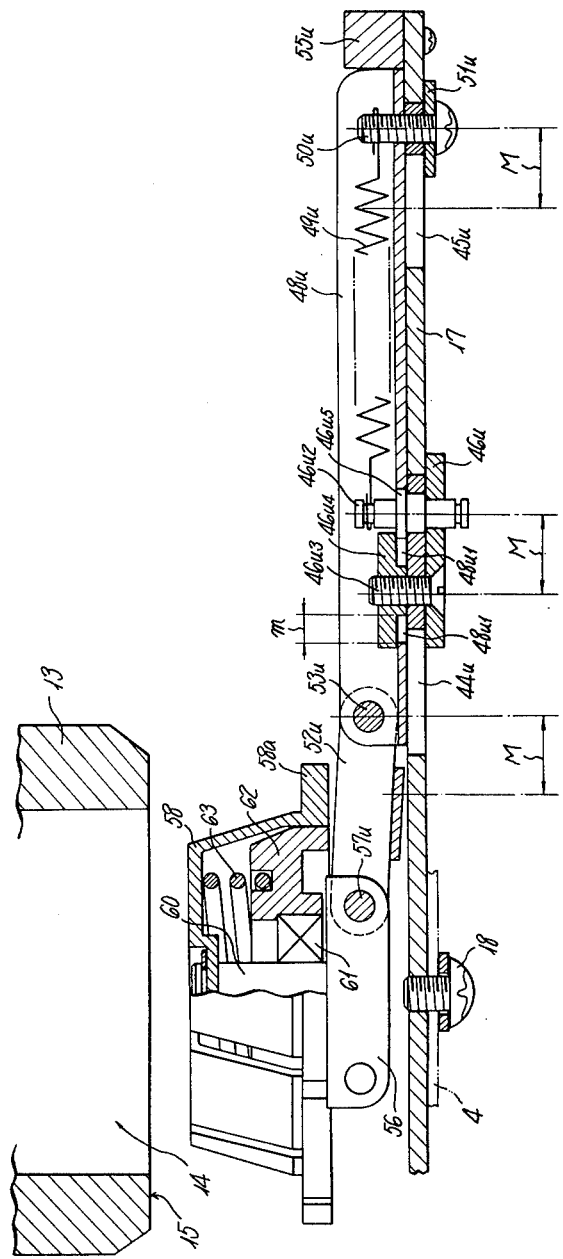
FIG. 17 is a cross section taken along the line X—X shown in FIG. 16.

Referring to FIG. 17, an arrangement associated with the clamp member 58 will be described. A taper block 62 is supported on the shaft 60 by means of a bearing 61. A dish-shaped abutment member 58 is fitted over the shaft 60 so as to cover the taper block 62, and is locked against removal by a snap ring or the like. The clamp member 58 is internally tapered which is generally conforming to the taper block 62, but is slightly at a reduced angle than the latter. It is to be noted that the base end of the clamp member 58 has an outer diameter which matches the central opening 3b formed in the record medium 3a. The upper surface of the taper block 62 is formed with a circular groove in which one end of a compression spring 63 is received, with the other end of the sring 63 bearing against the top portion of the clamp member 58. In this manner, the clamp member 58 is normally located so that it is spaced from or gently touching the tapered surface of the taper block 62 or in other words, it remains floating. The clamp member 58 is formed with a plurality of radially extending slits which extend through its flange portion 58a to communicate with the surrounding (see FIG. 15).

If the taper block 62 is fixed and the clamp member 58 is depressed against the resilience of the spring 63, the tapered portion of the taper block 62 will bear against the inner wall of the clamp member 58. In response to a further depression, the slits formed in the clamp member 58 causes it to expand, thus increasing its outer diameter. Such action is effective in properly centering the floppy disc 3a as it is clamped. The flange 58a is located opposite to the abutment surface 15 of the rotating member 15, so that when clamped, the rotatable record medium 3a is held between the flange 58a and the abutment surface 15.

A clamping action upon the floppy disc which takes place as the operating lever 4 is turned will now be described.

(A) Home position (see FIGS. 7, 8, 16 and 17)

The sliders 48u, 48d are located in abutment against the stops 55u, 55d, respectively, with links 52u, 52d slightly raised. For purpose of assuring a smooth operation, it is undesirable that the links 52u, 52d remain completely lying down.

The stepped movable member 46u abuts against the upper limit of the slot 44u under the resilience of the spring 49u so that the larger diameter portion 46u5 bears against the upper limit of the slot 48u1 under the resilience of the spring 49u. Simultaneously, the pin 46u2 bears against the end of the slot 47u1, thereby preventing an angular movement of the operating lever 4 which is urged to move in the opening direction. In similar manner, the stepped movable element 46d bears against the lower limit of the slot 44d under the resilience of the spring 59d so that the larger diameter portion 46d5 bears against the lower limit of the slot 48d1 under the resilience of the spring 49d.

In response to an angular movement of the operating lever 4 from the position shown in FIG. 7 to the position shown in FIG. 8, the floppy disc insertion and removal apparatus causes the floppy disc to be inserted to a given drive position. However, a clamping action upon the floppy disc must be prevented in the meantime. At this end, despite the angular movement of the operating lever 4, the slots 47u1, 47d1 formed in the links 47u, 47d merely slide along the pins 46u2, 46d2 without causing a movement of the stepped movable element 46u, 46d.

When the operating lever 4 has been turned angularly to the position shown in FIG. 8 where the movable member 34 has reached the end of its stroke, the ends of the slots 47u1, 47d1 are engaged by the pins 46u2, 46d2. Until this time, the clamp assembly is maintained in its home position.

Figure 9:
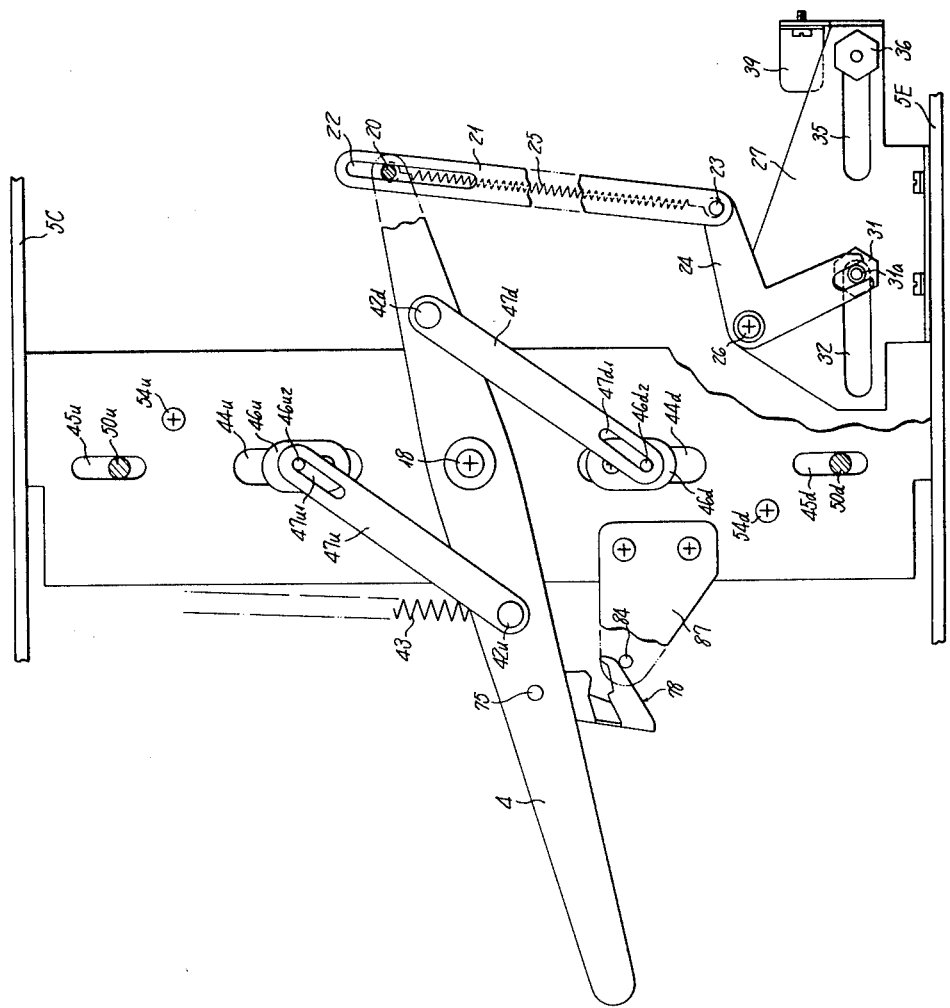

(B) Initiation of movement of clamp member (see FIGS. 9 and 17)

As the operating lever 4 moves angularly, the links 47u, 47d cause the stepped movable element 46u, 46d, respectively, to move toward each other. As a result of such movement, the slider 48u moves down against the resilience of the spring 59u while the slider 48d moves upward against the resilience of the spring 59d.

In response to the movement of the sliders 48u, 48d toward each other, the links 52u, 52d begin to be raised gradually. If the links 52u, 52d are not tilted even slightly at the home position, a smooth rising cannot be expected. In this manner, the links 52u move angularly about the pin 53u while the links 52d move angularly about the pin 53d, causing the pedestal 56 and the clamp member 58 to move toward the rotatable member 13. As will be apparent from such description, the sliders 48u, 48d, the links 52u, 52d and the pedestal 56 form a kind of toggle joint mechanism. Such toggle joint mechanism is one form of motion transmitting means which causes a reciprocating movement of the clamp member in a direction perpendicular to the plane of a floppy disc as the operating lever is moved angularly. Alternatively, one set of slider and link may be provided. Since the angular movement of the operating lever 4 causes the shaft 20 to move upward through the slot 22 against the resilience of the spring 25, such angular movement of the operating lever 4 has no influence whatsoever upon the floppy disc insertion and removal apparatus.

Other configurations of the motion transmitting means are illustrated in FIGS. 22 and 23. In this instance, the rear end of a clamp member 58' is maintained in abutment against a bevelled surface 102 of a block 101 which is caused by an operating lever 4' to move vertically, and the clamp member 58' is caused to move laterally in response to the vertical movement of the bevelled surface 102 (FIG. 22). It is to be understood that such mechanism is also contemplated in the present invention as the motion transmitting means.

Figure 18:
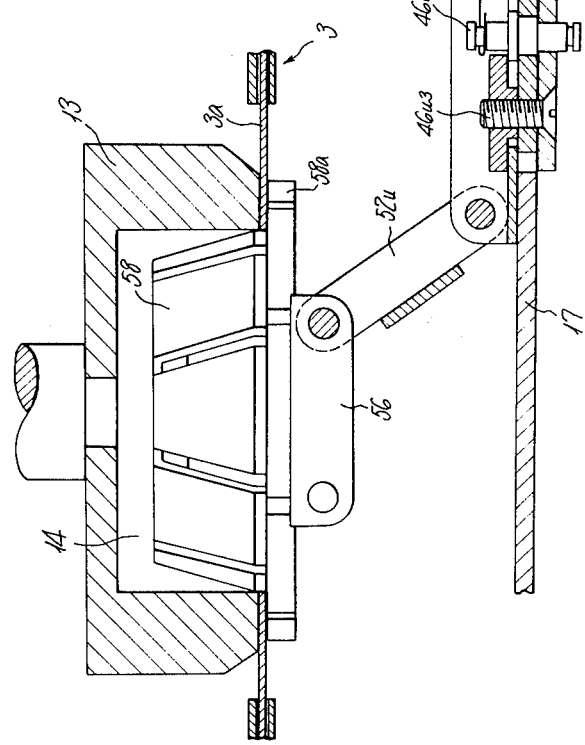
FIG. 18 is a side elevation of the clamp assembly when the floppy disc is clamped.

(c) Stop of movement of clamp member (see FIGS. 17 and 18)

In the manner mentioned above, in response to the angular movement of the operating lever 4, the clamp member 58 moves from its home position shown in FIG. 17, and when the screw 50u, pin 46u2 and pin 53u have moved through a distance M, the clamp member 58 is fitted into the recess 14 formed in the rotatable member 13 by passing through the central opening 3b in the rotatable record medium 3a, whereby the flange 58a is brought into abutment against the abutment surface 15 with the edge of the central opening interposed therebetween. The taper block 62 causes the clamp member 58 to be expanded, whereby the rotatable record medium 3a is centered on the rotatable member 13. In this manner, the movement of the clamp member 58 is stopped by the rotatable member 13, which prevents a further movement thereof.

Figure 12:
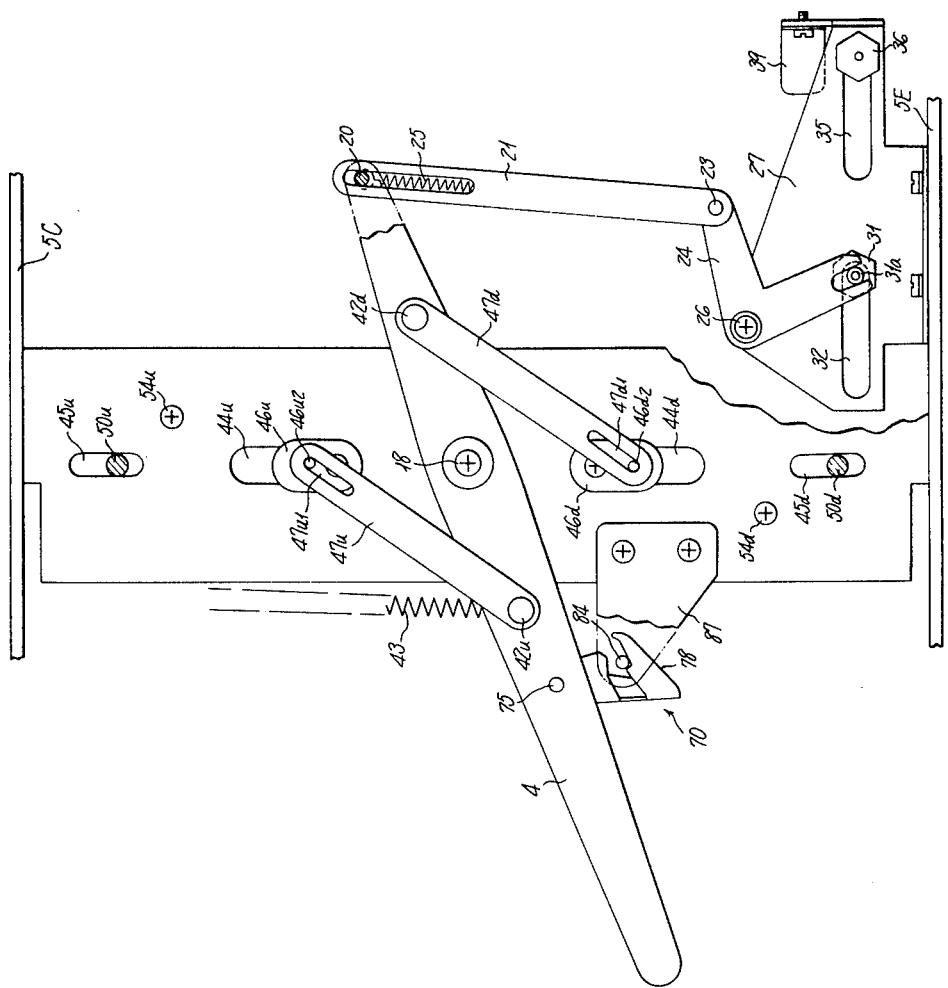

(D) Clamping action (see FIGS. 12, 17 and 18)

Though the movement of the clamp 58 is constrained by the rotatable member 13 in the manner mentioned above, a further angular movement of the operating lever 4 causes a force to be applied to the stepped movable elements 46u, 46d despite the fact that the sliders 48u, 48d are locked against movement, whereby the stepped movable elements 46u, 46d move down through the slots 48u1, 48d1 against the resilience of the springs 48u, 49d, respectively. The stroke of such movement is represented at m in FIG. 17. In any event, as a result of the fact that the larger diameter portions 46u5, 46d5 move away from the upper end of the slots 48u1, 48d1, the springs 49u, 49d which are now referenced to the pins 46u2, 46d2 become effective to pull the sliders 48u, 48d, whereupon the angular movement of the operating lever 4 may be interrupted and the latter locked in place, thus completing the clamping action upon the floppy disc.

In the present arrangement, the differential resilience between the springs 49u, 49d and the springs 59u, 59d is effective to provide a clamping force. If it is desired to utilize the resilience of the springs 49u, 49d efficiently, the springs 59u, 59d may be disposed to extend across the substrate 17 and the pins 46u2, 46d2, respectively.

(E) Return

When the operating lever 4 is unlocked, the springs 49u, 49d cause the stepped movable elements 46u, 46d to move until their larger diameter portions 46u5, 46d5 bear against the upper end or the right-hand end, as viewed in FIG. 17, of the slots 48u1, 49d1. Simultaneously, the cooperation between the springs 59u, 59d and the spring 43 cause the sliders 48u, 48d to move away from each other while allowing the links 52u, 52d to lie down or toward the parallel relationship with the plane of the substrate 17. In this manner, the arrangement returns to the home position shown in FIG. 7.

With the described arrangement, the clamping action of the floppy disc can be achieved very simply and reliably through the operation of the single operating lever. In addition, the overall thickness of the floppy disc drive including the clamp assembly can be considerably reduced.

(3) Lock/unlock assembly for the operating lever

Figure 19:
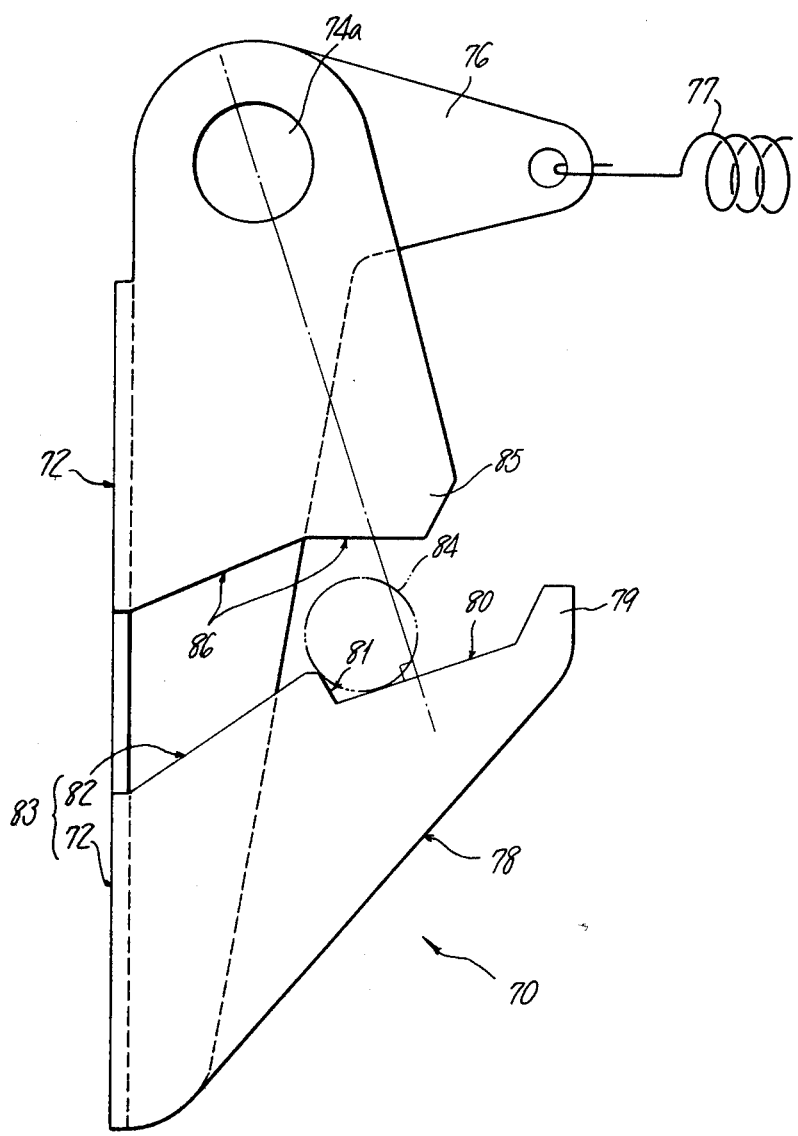
FIG. 19 is a front view of a hook member.
Figure 20:
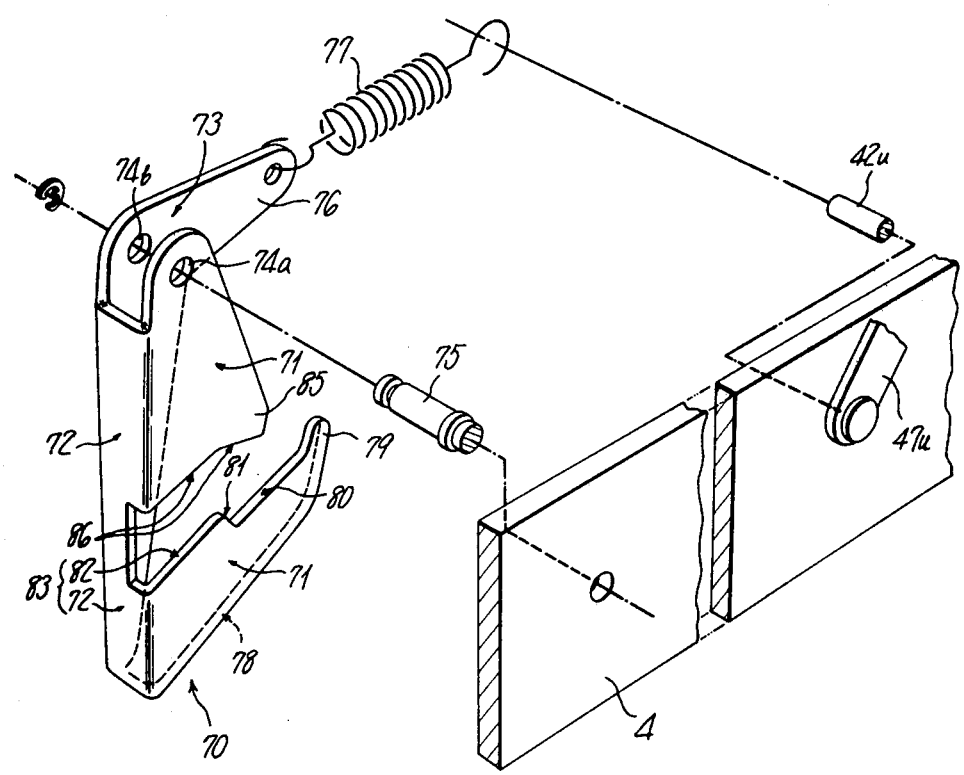
FIG. 20 is an exploded perspective view of an apparatus for locking and unlocking the rockable member.

Referring to FIGS. 15, 19 and 20, there is shown a hook 70 which represents the principal member of a lock/unlock assembly for the operating lever.

The hook 70 is generally channel-shaped, and includes a first plate 71, a slide plate 72 which is disposed at right angles to the first plate 71, and a second plate 73 which is disposed at right angles to the side plate 72 and in parallel relationship with the first plate 71. These three plates are contiguous with each other. At one end of the hook 70, a pair of aligned openings 74a, 74b are formed in the first and the second plate 71, 73 to receive a shaft 75 which is pivotally mounted in the operating lever 4. The second plate 73 extends from the region of the opening 74b to form a spring dent lever 76, the free end of which is engaged by one end of a tension spring 77, the other end of which is anchored to the pin 42 which extends through the operating lever 4. The lever 76 is pulled by the spring 77, whereby the hook 70 remains at rest at most stable angular position which is determined by such pulling action.

The bottom of the first plate 71 is formed with a first guide surface 78 which intersects, at an angle, with a direction of movement of the hook 70 as the latter depicts an arcuate trajectory in an integral manner with the operating lever 4 when the latter oscillates. The first guide surface 78 is formed with a first projection 79 at its end located toward the lever 76. In addition, the first plate is formed with a pin detent surface 80 which is contiguous with the first projection 79 and which is located on the opposite side of the first projection 79 from the first guide surface 78. The pin detent surface 80 is located in a region intermediate the first projection 79 and a boundary with a pin abutment surface 81 which rises upward from the surface 80, and is disposed such that a perpendicular struck from a point intermediate the length of the pin detent surface 80 extends through the center of the opening 74a. The pin abutment surface 81 continues to a surface 82 which is dispsoed substantially at right angles to the pin abutment surface 81, and the surface 82 merges with the sideplate 72. The combination of the surface 82 and a portion of the sideplate 72 which joins the surface 82 with the first guide surface 78 is referred to as a second guide surface 83. It will be seen that the first guide surface 78, the first projection 79, the pin detent surface 80, the pin abutment surface 81 and the second guide surface 83 form together a loop.

A detent pin (see FIG. 15) is disposed on a plate 87 which is integral with the substrate 17, and is located on the trajectory of the hook 70 which is followed as the operating lever 4 oscillates. A second projection 85 is formed on the first plate at a point which is spaced from the first projection 79 by a distance which is not less than the outer diameter of the pin 84. The first plate also includes a surface 86 located opposite to the pin detent surface 80 and the surface 82 and which is sufficiently spaced therefrom to permit the passage of the pin 84 therebetween.

The detent and release or lock/unlock operation will now be described. Referring to FIG. 8, when the operating lever 4, which is normally urged in the opening direction by the resilience or the spring 43, is moved angualarly in the closing direction, the hook 70 moves toward the pin 84 until it bears against the first guide surface 78 as shown in FIG. 9. As the operating lever 4 is further moved angularly, the first guide surface 78 is driven to rotate clockwise about the shaft 75 relative to the pin 74 which remains stationary, while simultaneously charging the spring 77.

Figure 10:
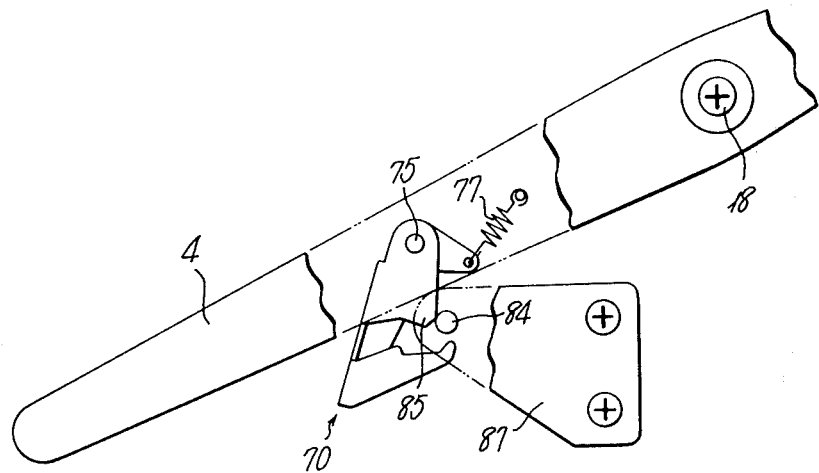
FIGS. 10, 11, 13 and 14 are front views showing the sequential steps of operation of the apparatus for locking or unlocking the rockable member or operating lever.

In response to a continued angular movement of the operating lever 4, the operating lever 4 abuts against the plate 87 which carries the pin 84, whereby its further angular movement is blocked, as shown in FIG. 10. By this time, the pin 84 has moved past the first projection 79, whereby the restoring force supplied by the charged spring 77 causes the hook 70 to move angularly to place the pin on the second projection 85. Such operation occurs when the operating lever 4 is angularly moved in the closing direction with a degree of speed. However, when the speed of the angular movement is slow, the pin 84 will ride up the first projection 79 momentarily before the operating lever 4 bears against the plate 87, as shown in FIG. 11.

When the operating lever 4 is released in the position shown in FIG. 10, for example, it obviously tends to rotate angularly in the opening direction, causing the pin 84 to be disengaged from the second projection 85. At the next moment, the hook 70 is driven for counterclockwise movement, as viewed in FIG. 10, about the shaft 75 under the resilience of the charged spring 77 until the pin abutment surface 81 abuts against the pin 84 where its angular movement is stopped. This represents the detent or locked position shown in FIG. 12 where the pin 84 is trapped between the pin detent surface 80 and the pin abutment surface 81, thus locking the operating lever 4 against angular movement in the opening direction.

Figure 11:
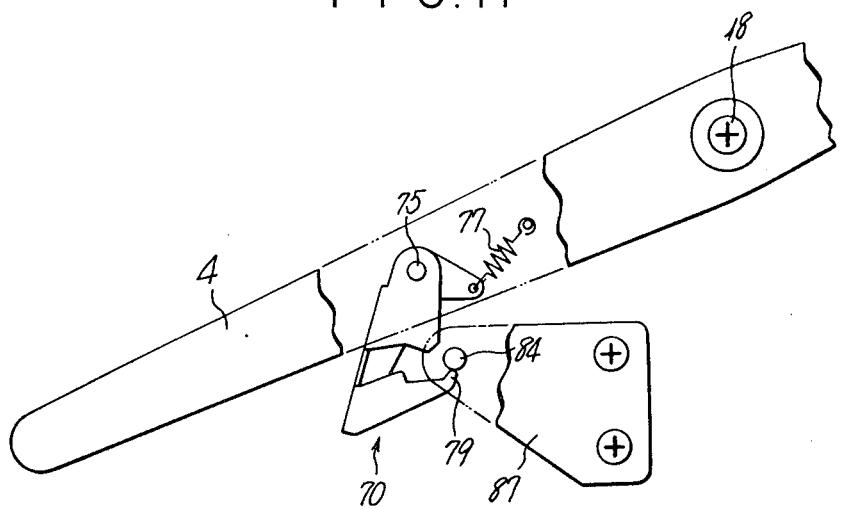

When the operating lever 4 is angularly moved slowly from the position shown in FIG. 11, for example, at the moment the pin 84 is disengaged from the first projection 79, the hook 70 is driven for counter-clockwise movement, as viewed in FIG. 11, about the shaft 75 under the resilience of the charged spring 77, and such angular movement is interrupted when the pin abutment surface 81 abuts against the pin 84. Again, such position is shown in FIG. 12 which represents the detent condition. To summarize, if the operating lever 4 is angularly driven either rapidly or slowly, there results no difference in locking the hook 70 (as well as the operating lever 4) at the given location where the pin 84 is disposed.

Figure 13:
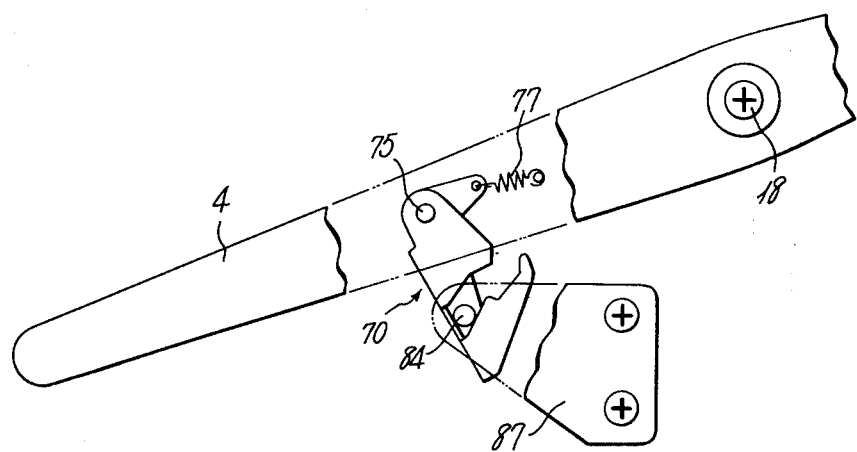
Figure 14:
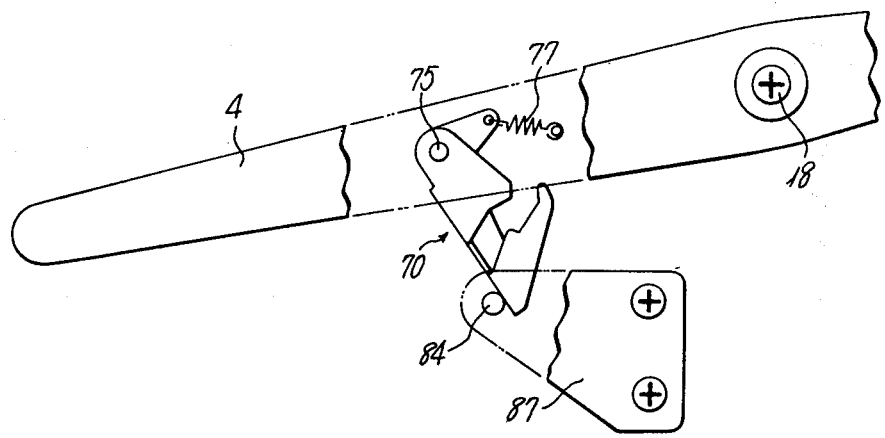

To unlock, the operating lever 4 may be slightly turned in the closing direction. In response thereto, the pin 84 is released from the first abutment surface 81. As the same time as such release, the hook 70 is further driven to move counter-clockwise until the entire restoring force of the spring 77 is exhausted. When the resilience of the spring 77 is exhausted, the pin 84 will be situated between the opposing surfaces 82, 86 (see FIGS. 13 and 19).

In response to the angular movement of the operating lever 4 in the opening direction, the pin 84 causes the hook 70 to move counter-clockwise about the shaft 75 while it is being guided by the surface 82, thus again charging the spring 77. A further angular movement of the operating lever 4 causes the pin 84 to slide along the sideplate 72 which represents the second guide surface 83 and allows the pin to be disengaged therefrom. At the same time as the disengagement, the restoring force of the charged spring 77 causes the hook 70 to move clockwise, thus returning it to its home position which it assumes to cause the pin 84 to abut against the first guide surface 78 as the operating lever 4 is angularly moved in the closing direction.

It is to be understood that the lock/unlock assembly for the operating lever as mentioned above is utilized in locking and unlocking the operating lever 4 when clamping the floppy disc. With this arrangement, the operating lever can be simply locked and unlocked.

Figure 21:
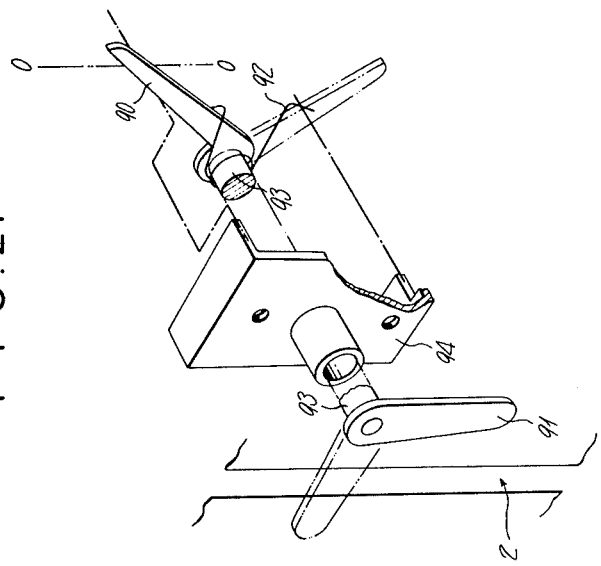
FIG. 21 is an exploded perspective view of an apparatus for preventing a double insertion of floppy discs.

Finally referring to FIGS. 2 and 21, a lever 90 is disposed on the path of angular movement 0-0 of the operating lever 4 to be driven thereby as the latter angularly moves in the closing direction. The lever 90 is associated with a shaft 93, which is integrally formed with a rotatable piece 91. As shown in FIG. 21, the shaft 93 is supported by a bearing plate 94 which is in turn mounted on the side wall 5B. The rotatable piece 91 is urged to rotate counter-clockwise, as views in FIG. 21, by means of a spring 92. When the operating lever 4 is at its upper limit, the lever 90 bears against the bearing plate 94 and is prevented from rotation under the resilience of the spring 92, and is located on the path of angular movement of the operating lever 4. The rotatable piece 91 is parallel to the inlet 2.

The described arrangement forms a mechanism for preventing the insertion of double floppy discs. When the operating lever 4 is angularly moved in the closing direction, it drives the lever 90 to cause an angular movement of the rotatable piece 91 to cause it to assume a position in which it perpendicularly intersects with the inlet 2, thus locally blocking the inlet.

When the operating lever 4 has been moved to its lower limit, in other words, when the clamp assembly has clamped the floppy disc and the lock/unlock assembly has locked the operating lever 4, an inadvertent insertion of another floppy disc is prevented by the presence of the rotatable piece 90.

As an alternative arrangement for clamping a floppy disc, there is known a mechanism which clamps or unclamps a floppy disc in interlocked relationship with the opening/closing of a lid which has its one end pivotally mounted on a stationary member. The mechanism includes a movable member which is used for displacing a floppy disc, and which is driven in directions to insert or remove the floppy disc as the lid is opened or closed. When such movable member is provided with means for holding the floppy disc, constructed in accordance with the invention, and the lid is treated as the operating lever mentioned above, the resulting arrangement will form one embodiment of the invention.

What is claimed is:

1. A floppy disc drive including a rotatable member having an abutment surface and also including a clamp member which is movable toward or away from the abutment surface and in which a floppy disc is held between the abutment surface and the clamp member for rotation together with the rotatable member for purpose of information recording and retrieval, comprising an operating lever which is oscillatable in a plane located within the disc drive and parallel to the plane of a floppy disc which is mounted in place, motion transmitting means responsive to the oscillation of the operating lever to cause a reciprocating movement of the clamp member in a direction perpendicular to the plane of the floppy disc, and lock/unlock means for locking the operating lever at a given position and for unlocking it therefrom, wherein the disc drive includes a frame having a substrate mounted thereon or integrally connected therewith, and said lock/unlock means is disposed intermediate the substrate and the operating lever and locks or unlocks the operating lever adjacent to the end of the forward stroke of the clamp member.

2. A floppy disc drive according to claim 1 in which the disc drive includes a frame having a substrate mounted thereon or intergrally connected therewith, and in which the operating lever is pivotally mounted on the substrate and has its one end externally exposed to provide an operating handle by a user.

3. A floppy disc drive according to claim 2 in which the operating lever is normally urged in one direction by resilient means.

4. A floppy disc drive according to claim 3 in which the resilient means comprises a tension spring extending between the operating lever and the substrate.

5. A floppy disc drive according to claim 2 in which a stop is provided on the substrate for limiting the movement of the slider.

6. A floppy disc drive according to claim 5 in which the stop is formed by a pillar block mounted on the substrate.

7. A floppy disc drive according to claim 1 in which the operating lever has a pivot thereon intermediate its length, and further including a pair of links which have their one end pivotally connected with the operating lever at points which are symmetrical to each other with respect to the pivot, the other end of the links being connected to the motion transmitting means.

8. A floppy disc drive according to claim 1 in which the operating lever has a pivot intermediate its length, and further including a link which has its one end pivotally connected to the operating lever remote from the pivot thereof, the other end of the link being connected to the motion transmitting means.

9. A floppy disc drive according to claim 1 in which the resilient means comprises a tension spring extending between a pin fixedly mounted on the substrate and a pin on which the slider and the toggle link are pivotally mounted, and wherein a bushing is engaged with the slot formed in the substrate and is movable therealong, the bushing being integrally coupled with the slider by means of a screw, a stepped movable element being engaged with another slot formed in the substrate and is movable therealong, the stepped movable element also engaging a slot formed in the slider, said another resilient means being a tension spring extending between the screw and the stepped movable element.

10. A floppy disc drive according to claim 1 in which the motion transmitting means comprises a clamp member located within the disc drive and guided for movement in a direction perpendicular to the plane of a floppy disc which is mounted in place, a support member for the clamp member, a block having a bevelled surface adapted to abut against the rear end of the support member and guided for movement in the direction perpendicular to the direction of movement of the clamp member, and resilient means for normally urging the support member into abutment against the bevelled surface, the block being engaged with the operating lever at a point other than the pivot thereof.

11. A floppy disc drive according to claim 1 in which the lock/unlock means comprises a hook pivotally mounted on the operating lever, and a detent pin disposed at a given point on the trajectory followed by the hook as the operating lever oscillates, the hook being formed with a guide surface adapted to initially abut against the pin to guide it to a first projection as the operating lever oscillates in the closing direction, a pin detent surface formed contiguous with the first projection and in opposing relationship with the first guide surface, a pin abutment surface which rises from the pin detent surface and a second guide surface connecting the pin abutment surface with the first guide surface, the described surfaces being formed in seriatum to define a loop, there being provided a second projection located in opposing relationship with the first projection and separated therefrom by a distance equal to or greater than the outer diameter of the pin, there being provided resilient means disposed between the hook and the lever for urging the hook in a manner such that the pin abuts against the pin abutment surface whenever the pin is locked by either the first or the second projection and for urging the hook toward its original position after the pin has been unlocked from the pin abutment surface.

12. A floppy disc drive according to claim 1 in which the lock/unlock means comprises a hook having its one end connected to a stationary member and which is engageable with the operating lever.

13. A floppy disc drive including a rotatable member having an abutment surface and also including a clamp member which is movable toward or away from the abutment surface and in which a floppy disc is held between the abutment surface and the clamp member for rotation together with the rotatable member for purpose of information recording and retrieval, comprising an operating lever which is oscillatable in a plane located within the disc drive and parallel to the plane of a floppy disc which is mounted in place, motion transmitting means responsive to the oscillation of the operating lever to cause a reciprocating movement of the clamp member in a direction perpendicular to the plane of the floppy disc, and lock/unlock means for locking the operating lever at a given position and for unlocking it therefrom, in which the motion transmitting means comprises a toggle joint mechanism.

14. A floppy disc drive according to claim 13 in which the toggle joint mechanism comprises a slider urged by the operating lever, as it oscillates, to move in one direction as constrained by guide means, a toggle link connected to the slider, and a pedestal connected to the toggle link, the clamp member being mounted on the pedestal.

15. A floppy disc drive according to claim 14 in which a pair of toggle joint mechanisms are provided with the pedestal in common.

16. A floppy disc drive according to claim 14 in which at the home position of the toggle joint mechanism, the toggle link assumes a slightly raised position defined by a stop which is mounted on the substrate and which abuts against the slider.

17. A floppy disc drive according to claim 14 in which the guide means comprises elongate slots formed in the substrate and a member extending through the slot to be secured to the slider.

18. A floppy disc drive according to claim 17 in which the slots are distributed along the direction of movement of the slider.

19. A floppy disc drive according to claim 18 in which one of the slots is engaged by a bushing which is movable along the length of the slot, the bushing being integrally coupled with the slider by means of a screw, another one of the slots being engaged by a stepped movable element which is movable along the length of the slot and which also engages an elongate slot formed in the slider, a tension spring extending between the screw and the stepped movable element.

20. A floppy disc drive according to claim 19 in which a pin is fixedly mounted on the stepped movable element and is connected to one end of a link, the other end of which is pivotally mounted in the operating lever.

21. A floppy disc drive according to claim 14 further including resilient means connected to either the slider or the toggle link for uring the toggle joint mechanism to its collapsed position.

22. A floppy disc drive according to claim 21 in which the resilient means comprises a tension spring extending between a pin on the substrate and another pin on which the slider and the toggle link are pivotally mounted.

23. A floppy disc drive according to claim 21 in which the toggle joint mechanism is maintained in its erect position against the resilient means when a floppy disc is to be clamped, the toggle joint mechanism being urged toward its collapsed position by another resilient means, whereby a differential resilience between the both resilient means causes the clamp member to abut against the abutment surface of the rotatable member.

24. A floppy disc drive according to claim 23 in which said another resilient means comprises a tension spring extending between the substrate and the slider.

25. A floppy disc drive comprising an operating lever which undergoes an angular movement as a floppy disc is inserted into or removed from a given loaded position within the disc drive, motion translating means for translating the oscillating motion of the operating lever into a rectilinear reciprocating motion of a movable member, means formed integrally with the movable member for holding a floppy disc, and lock/unlock means for locking the operating lever at an angular position assumed when a floppy disc is inserted into the loaded position and for unlocking the operating lever, wherein the lock/unlock means is disposed between a substrate and the operating lever for locking or unlocking the operating lever adjacent to the end of the forward stroke of a floppy disc holding member.

26. A floppy disc drive according to claim 25 in which the disc drive includes a frame having a substrate mounted thereon or integrally connected therewith, and the operating lever is pivotally mounted on the substrate, one end of the operating lever being externally exposed to provide a handle for operation by a user.

27. A floppy disc drive according to claim 26 in which the operating lever is normally urged to move angularly in one direction by resilient means.

28. A floppy disc drive according to claim 27 in which the resilient means comprises a tension spring extending between the operating lever and the substrate.

29. A floppy disc drive comprising an operating lever which undergoes an angular movement as a floppy disc is inserted into or removed from a given loaded position within the disc drive, motion translating means for translating the oscillating motion of the operating lever into a rectilinear reciprocating motion of a movable member, means formed integrally with the movable member for holding a floppy disc, and lock/unlock means for locking the operating lever at an angular position assumed when a floppy disc is inserted into the loaded position and for unlocking the operating lever, in which the lock/unlock means comprises a hook having its one end connected to a stationary member and which is engageable with the operating lever.

30. A floppy disc drive comprising an operating lever which undergoes an angular movement as a floppy disc is inserted into or removed from a given loaded position within the disc drive, motion translating means for translating the oscillating motion of the operating lever into a rectilinear reciprocating motion of a movable member, means formed integrally with the movable member for holding a floppy disc, and lock/unlock means for locking the operating lever at an angular position assumed when a floppy disc is inserted into the loaded position and for unlocking the operating lever, in which the lock/unlock means comprises a hook pivotally mounted on the operating lever and a detent pin which is fixedly disposed at a given point on a trajectory which is followed by the hook as the operating lever oscillates in the closing direction, the hook being formed with a first guide surface adapted to initially abut against the pin to guide the pin to a first projection as the operating lever oscillates, a detent pin surface contiguous with the first projection and disposed in opposing relationship with the first guide surface, a pin abutment surface which rises upward from the pin detent surface, and a second guide surface which joins the pin abutment surface with the first guide surface, all of the described surfaces being formed seriatim to define a loop, there being provided a second projection which is disposed in opposing relationship with the first projection and separated from the latter by a distance equal to or greater than the outer diameter of the pin, there being provided resilient means disposed between the hook and the lever for urging the hook in a manner such that the pin abuts against the pin abutment surface whenever the pin is locked by the first or the second projection and for urging the hook to return it to its original position after the pin has been unlocked from the pin abutment surface.

31. A floppy disc drive comprising an operating lever which undergoes an angular movement as a floppy disc is inserted into or removed from a given loaded position within the disc drive, motion translating means for translating the oscillating motion of the operating lever into a rectilinear reciprocating motion of a movable member, means formed integrally with the movable member for holding a floppy disc, and lock/unlock means for locking the operating lever at an angular position assumed when a floppy disc is inserted into the loaded position and for unlocking the operating lever, in which the motion translating means comprises a bell crank mechanism having a link engaged with one end of the operating lever, a bell crank having its one end pivotally connected with the link, a movable element integral with the movable member and engaging the other end of the bell crank, and a guide for guiding the movable element for movement in a direction parallel to the direction in which a floppy disc is inserted or removed from the disc drive.

32. A floppy disc drive according to claim 31, further including a pair of stops for limiting the stroke of movement of the movable element.

33. A floppy disc drive according to claim 31 in which the movable element is urged by resilient means for movement in a direction to remove a floppy disc.

34. A floppy disc drive according to claim 33 in which the resilient means comprises a tension spring extending between the operating lever and the substrate.

35. A floppy disc drive according to claim 31 in which the bell crank is formed by an L-shaped plate and is pivotally mounted on a stationary member intermediate its length, the bell crank having its one end pivotally connected with the link and its other end formed with a recess.

36. A floppy disc drive according to claim 35 in which the stationary member is a plate which is integrally connected with a floppy disc and having an upright surface.

37. A floppy disc drive according to claim 31 in which the movable element has a shank which engages a recess formed in the other end of the bell crank.

38. A floppy disc drive according to claim 37 in which the lock/unlock means comprises a hook having its one end connected to a stationary member and is engageable with the operating lever.

39. A floppy disc drive according to claim 31 in which the guide comprises an elongate slot engaged by the shank of the movable element, the lengthwise direction of the slot being parallel to the direction in which a floppy disc is inserted or removed.

40. A floppy disc drive comprising an operating lever which undergoes an angular movement as a floppy disc is inserted into or removed from a given loaded position within the disc drive, motion translating means for translating the oscillating motion of the operating lever into a rectilinear reciprocating motion of a movable member, means formed integrally with the movable member for holding a floppy disc, and lock/unlock means for locking the operating lever at an angular position assumed when a floppy disc is inserted into the loaded position and for unlocking the operating lever, in which the floppy disc holding means comprises a pair of holder pieces mounted on the movable member and disposed in opposing relationship with each other and the free ends of the pair of holder pieces are bent in a direction away from each other, thereby presenting a substantially V-shaped configuration.

41. A floppy disc drive including a rotatable member having an abutment surface, and also including a clamp member which is movable toward or away from the abutment surface and in which a floppy disc is held between the abutment surface and the clamp member for rotation together with the rotatable member for purpose of information recording and retrieval; comprising an operating lever disposed for angular movement as a floppy disc is inserted into or removed from a given loaded position within the disc drive, the operating lever being oscillatable in a plane parallel to the plane of a floppy disc which assumes its loaded position, motion transmitting means responsive to the oscillation of the operating lever to cause a reciprocating movement of the clamp member in a direction perpendicular to the plane of the floppy disc, lock/unlock means for locking the operating lever at an angular position which is assumed when the floppy disc is located at its loaded position and is held between the clamp member and the abutment surface, and for unlocking the operating lever, motion translating means for translating the oscillating motion of the operating lever into a rectilinear reciprocating motion of the movable member, and means formed integrally with the operating lever for holding a floppy disc.

42. A floppy disc drive according to claim 41 in which the operating lever is pivotally mounted on a substrate which is mounted on or integral with a frame of the disc drive and has its one end externally exposed to provide a handle for operation by a user.

43. A floppy disc drive according to claim 42 in which the operating lever is normally urged by resilient means for angular movement in one direction.

44. A floppy disc drive according to claim 43 in which the resilient means comprises a tension spring extending between the operating lever and the substrate.

45. A floppy disc drive according to claim 42 in which a stop is provided on the substrate for limiting the movement of the slider.

46. A floppy disc drive according to claim 45 in which the stop comprises a pillar block on the substrate.

47. A floppy disc drive according to claim 41 in which the lock/unlock means is disposed between the substrate and the operating lever for locking or unlocking the operating lever adjacent to the end of the forward stroke of the clamp member.

48. A floppy disc drive according to claim 41 in which the motion transmitting means comprises a toggle joint mechanism.

49. A floppy disc drive according to claim 48 in which the toggle joint mechanism comprises a slider which is urged by the operating lever as the latter oscillates for movement in one direction as guided by guide means, a toggle link connected to the slider, and a pedestal connected to the toggle link, the clamp member being mounted on the pedestal.

50. A floppy disc drive according to claim 49 in which a pair of toggle joint mechanisms are provided with the pedestal in common.

51. A floppy disc drive according to claim 49 in which the toggle link is disposed to be slightly raised at its home position which is defined by a stop mounted on the substrate and which abuts against the slider.

52. A floppy disc drive according to claim 49 in which the guide means comprises elongate slots formed in the substrate, and a member which extends through the slot and secured to the slider.

53. A floppy disc drive according to claim 52 in which the slots are distributed along the direction of movement of the slider.

54. A floppy disc drive according to claim 53 in which one of the slots is engaged by a bushing which is movable along the length of the slot, the bushing being integrally coupled to the slider by means of a screw, another one of the slots being engaged by a stepped movable element which is movable along the length of the slot, the movable element also engaging another slot formed in the slider, a tension spring extending between the screw and the stepped movable element.

55. A floppy disc drive according to claim 49, further including a substrate mounted on or integral with a frame of the disc drive, the operating lever being pivotally mounted to the substrate, and resilient means connected between the substrate and either the slider or the toggle link for urging the toggle joint mechanism toward its collapsed position.

56. A floppy disc drive according to claim 55 in which the resilient means comprises a tension spring extending between a pin fixedly mounted on the substrate and a pin on which the slider and the toggle link are pivotally mounted.

57. A floppy disc drive according to claim 55 in which the toggle joint mechanism is maintained in its erect position against resilient means whenever a floppy disc is to be clamped, another resilient means acting upon the toggle joint mechanism to urge it toward its collapsed position, a differential resilience between the both resilient means causing the clamp member to abut against the abutment surface of the rotatable member.

58. A floppy disc drive according to claim 57 in which said another resilient means comprises a tension spring extending between the substrate and the slider.

59. A floppy disc drive according to claim 58 in which the stepped movable element fixedly carries a pin engaged by one end of a link, the other end of which is pivotally mounted on the operating lever.

60. A floppy disc drive according to claim 55 in which the resilient means comprises a tension spring extending between a pin fixedly mounted on the substrate and another pin on which the slider and the toggle link are pivotally mounted, and wherein a bushing engages an elongate slot formed in the substrate and is movable therealong, the bushing being integrally coupled to the slider by means of a screw, a stepped movable element being engaged with another slot formed in the substrate and being movable therealong, the stepped movable element also engaging an elongate slot formed in the slider, said another resilient means being a tension spring extending between the screw and the stepped movable element.

61. A floppy disc drive according to claim 41 in which the operating lever has a pivot intermediate its length, and further including a pair of links having their one end pivotally connected with points on the operating lever which are symmetrical to each other with respect to the pivot, the other end of each link being connected to the motion transmitting means.

62. A floppy disc drive according to claim 41 in which the operating lever has a pivot intermediate its length, and further including a link having its one end connected to the operating lever at a point remote from the pivot, the other end of the link being connected to the motion transmitting means.

63. A floppy disc drive according to claim 41 in which the motion transmitting means comprises a clamp member disposed within the disc drive for movement in a direction perpendicular to the plane of a floppy disc which assumes its loaded position, a support member for the clamp member, a block having a bevelled surface adapted to bear against the rear end of the support member and disposed for movement in a direction perpendicular to the direction of movement of the clamp member, and resilient means for normally urging the support member so that its end abuts against the bevelled surface, the block engaging the operating lever at a point other than the pivot thereof.

64. A floppy disc drive according to claim 41 in which the lock/unlock means comprises a hook pivotally mounted on the operating lever and a detent pin fixedly disposed at a point on a trajectory which is followed by the hook as the operating lever oscillates, the hook being formed with a first guide surface adapted to initially abut against the pin to guide the pin to a first projection as the operating lever oscillates in the closing direction, a pin detent surface contiguous with the first projection and disposed in opposing relationship with the first guide surface, a pin abutment surface which rises upward from the pin detent surface and a second guide surface which joins the pin abutment surface with the first guide surface, all of the described surfaces being formed in seriatim to define a loop, there being provided a second projection disposed in opposing relationship with the first projection and separated therefrom by a distance equal to or greater than the outer diameter of the pin, there being also provided resilient means disposed between the hook and the operating lever for urging the hook in a direction to cause the pin to abut against the pin abutment surface whenever the pin is locked by either the first or the second projection and for urging the hook to return it to its original position after the pin has been unlocked from the pin abutment surface.

65. A floppy disc drive according to claim 41 in which the motion translating means comprises a bell crank mechanism.

66. A floppy disc drive according to claim 65 in which the bell crank mechanism comprises a link engaged with one end of the operating lever, a bell crank pivotally connected with one end of the link, a movable element formed integrally with the movable member and engaging with the other end of the bell crank, and a guide for causing the movable element to move in a direction parallel to the direction in which a floppy disc is inserted or removed.

67. A floppy disc drive according to claim 66, further including a pair of stops for limiting the stroke of movement of the movable element.

68. A floppy disc drive according to claim 66 in which the movable element is urged by resilient means to move in a direction parallel to the direction in which a floppy disc is removed.

69. A floppy disc drive according to claim 68 in which the resilient means comprises a tension spring extending between the operating lever and the substrate.

70. A floppy disc drive according to claim 66 in which the bell crank is formed by a L-shaped plate which is pivotally mounted on a stationary member intermediate its length, the bell crank having its one end pivotally connected to the link and its other end formed with a recess.

71. A floppy disc drive according to claim 70 in which the stationary member comprises a plate which is integral with a floppy disc and has an upright surface.

72. A floppy disc drive according to claim 66 in which the movable element has a shank which engages a recess formed in the other end of the bell crank.

73. A floppy disc drive according to claim 66 in which the guide is formed by an elongate slot which is engaged by the shank of the movable element, the lengthwise direction of the slot being parallel to the direction in which a floppy disc is inserted or removed.

74. A floppy disc drive according to claim 73 in which the free ends of the pair of holder pieces are bent away from each other, thereby presenting a substantially V-shaped configuration.

75. A floppy disc drive according to claim 41 in which the floppy disc holding means comprises a pair of oppositely located holder pieces which are mounted on the operating lever.

76. A floppy disc drive according to claim 41 in which the operating lever and the motion translating means are connected together by a link while the operating lever and the motion transmitting means are connected together by another link, the first mentioned link being provided with relief means which prevents undue force from being applied to the movable element as a result of a continued angular movement of the operating lever after the movable element has reached the end of its stroke, said another link being provided with control means which prevents the angular movement of the operating lever from being transmitted to the motion transmitting means until the movable element reaches the end of its stroke.

77. A floppy disc drive according to claim 76 in which the relief means is formed by one end of the operating lever and the first mentioned link which represents part of the motion translating means, and comprises an elongate slot formed in the link, a shaft integral with the operating lever and engaging the slot, and resilient means for maintaining the shaft against one end of the slot until the operating lever has moved the holding means to the end of its stroke.

78. A floppy disc drive according to claim 77 in which the resilient means comprises a tension spring extending between the pivotal connection between the operating lever and the motion translating means and the shaft.

79. A floppy disc drive according to claim 76 in which the control means comprises an elongate slot formed in said another link and a pin engaging the slot, the pin being integral with a stepped movable element which operates to transmit the motion of the operating member, the stepped movable element engaging with a slider which forms a toggle joint mechanism.

* * * * *